US009425882B2

(12) United States Patent
Harel et al.

(10) Patent No.: US 9,425,882 B2
(45) Date of Patent: Aug. 23, 2016

(54) WI-FI RADIO DISTRIBUTION NETWORK STATIONS AND METHOD OF OPERATING WI-FI RDN STATIONS

(71) Applicant: Magnolia Broadband Inc., Englewood, NJ (US)

(72) Inventors: Haim Harel, New York, NY (US); Phil F. Chen, Denville, NJ (US); Stuart S. Jeffery, Los Altos, CA (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 13 days.

(21) Appl. No.: 14/250,767

(22) Filed: Apr. 11, 2014

(65) Prior Publication Data

US 2015/0131752 A1 May 14, 2015

Related U.S. Application Data

(60) Provisional application No. 61/903,178, filed on Nov. 12, 2013, provisional application No. 61/840,525, filed on Jun. 28, 2013.

(51) Int. Cl.
*H04B 7/08* (2006.01)

(52) U.S. Cl.
CPC ............. *H04B 7/0871* (2013.01); *H04B 7/086* (2013.01); *H04B 7/088* (2013.01)

(58) Field of Classification Search
CPC ..... H04B 7/0871; H04B 7/086; H04B 7/088
USPC ....... 375/227, 267, 285, 296, 316, 340, 346, 375/347; 370/208–210, 252, 328, 334, 338
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 189 303 | 3/2002 |
| EP | 1 867 177 | 5/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Daniel Washburn
*Assistant Examiner* — Eboni Hughes
(74) *Attorney, Agent, or Firm* — Pearl Cohen Zeder Latzer Baratz LLP

(57) ABSTRACT

A Wi-Fi radio distribution network (RDN) station is provided for use in a wireless communications network comprising a plurality of wireless stations. The Wi-Fi RDN station comprises a multiple-input-multiple-output (MIMO) receiving system configured to operate in accordance with a channel estimation MIMO receiving scheme; and a RDN connected to the MIMO receiving system. The RDN comprises at least one beamformer arranged to be fed by two or more antennas, wherein each of the beamformers includes a combiner configured to combine signals coming from a plurality of antennas associated with the respective beamformer into a single signal. The MIMO receiving system is configured to perform one or both of channel estimation using a single antenna or beamforming. Both channel estimation and beamforming may be based on one or more packets addressed to one or more wireless stations in the communications network other than the Wi-Fi RDN station.

13 Claims, 10 Drawing Sheets

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,904,086 B2 | 3/2011 | Kundu et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,115,679 B2 | 2/2012 | Falk | |
| 8,155,613 B2 | 4/2012 | Kent et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 * | 2/2013 | Stirling-Gallacher | H04B 7/0408 |
| | | | 375/260 |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 * | 12/2013 | Kludt | H04B 7/0413 |
| | | | 348/607 |
| 8,599,979 B2 | 12/2013 | Farag et al. | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,744,511 B2 | 6/2014 | Jones et al. | |
| 8,767,862 B2 | 7/2014 | Abreu et al. | |
| 8,780,743 B2 | 7/2014 | Sombrutzki et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0098605 A1 | 5/2006 | Li | |
| 2006/0111149 A1 | 5/2006 | Chitrapu et al. | |
| 2006/0135097 A1 | 6/2006 | Wang et al. | |
| 2006/0183503 A1 | 8/2006 | Jeffrey Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115882 A1 | 5/2007 | Wentink | |
| 2007/0115914 A1 | 5/2007 | Ohkubo et al. | |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2007/0249386 A1 | 10/2007 | Bennett | |
| 2008/0043867 A1 | 2/2008 | Blanz et al. | |
| 2008/0051037 A1 | 2/2008 | Molnar et al. | |
| 2008/0081671 A1 | 4/2008 | Wang et al. | |
| 2008/0095163 A1 | 4/2008 | Chen et al. | |
| 2008/0108352 A1 | 5/2008 | Montemurro et al. | |

(56) References Cited

U.S. PATENT DOCUMENTS

| | | |
|---|---|---|
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1* | 10/2008 | Gu .................. H04B 7/024 370/338 |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1* | 5/2009 | Sherman et al. ............ 455/41.2 |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1* | 2/2011 | Yeung et al. .................. 370/280 |
| 2011/0032972 A1 | 2/2011 | Wang et al. |
| 2011/0085465 A1 | 4/2011 | Lindoff et al. |
| 2011/0085532 A1* | 4/2011 | Scherzer et al. ............ 370/338 |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1* | 10/2011 | Chrisikos et al. ............ 370/252 |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1* | 4/2013 | Bhattacharya ................ 370/328 |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0172029 A1 | 7/2013 | Chang et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1 | 11/2013 | Ghosh et al. |
| 2013/0322509 A1* | 12/2013 | Harel ................... H04B 7/0413 375/227 |
| 2013/0322559 A1* | 12/2013 | Kludt ................... H04B 7/0413 375/267 |
| 2013/0331136 A1 | 12/2013 | Yang et al. |
| 2013/0343369 A1* | 12/2013 | Yamaura ....................... 370/338 |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1* | 3/2014 | Safavi ............................ 370/252 |
| 2014/0086081 A1 | 3/2014 | Mack et al. |
| 2014/0098681 A1 | 4/2014 | Stager et al. |
| 2014/0119288 A1 | 5/2014 | Zhu et al. |

(56) References Cited

U.S. PATENT DOCUMENTS

| 2014/0126620 | A1* | 5/2014 | Maltsev | H04B 7/0413 |
| | | | | 375/227 |
| 2014/0185501 | A1 | 7/2014 | Park et al. | |
| 2014/0185535 | A1 | 7/2014 | Park et al. | |
| 2014/0192820 | A1 | 7/2014 | Azizi et al. | |
| 2014/0204821 | A1 | 7/2014 | Seok et al. | |
| 2014/0241182 | A1 | 8/2014 | Smadi | |
| 2014/0307653 | A1 | 10/2014 | Liu et al. | |

FOREIGN PATENT DOCUMENTS

| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.

(56) References Cited

OTHER PUBLICATIONS

Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, no. Ljubljana; Jan. 7, 2009, pp. 1-4.
Alcatel-Lucent Shanghai Bell et al., "Antenna Array Calibration for TDD CoMP", 3GPP Draft; R1100427, $3^{rd}$ Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.

* cited by examiner

Figure 3: Data-ACK timeline

Figure 4: Network Allocation Vector (NAV) timeline

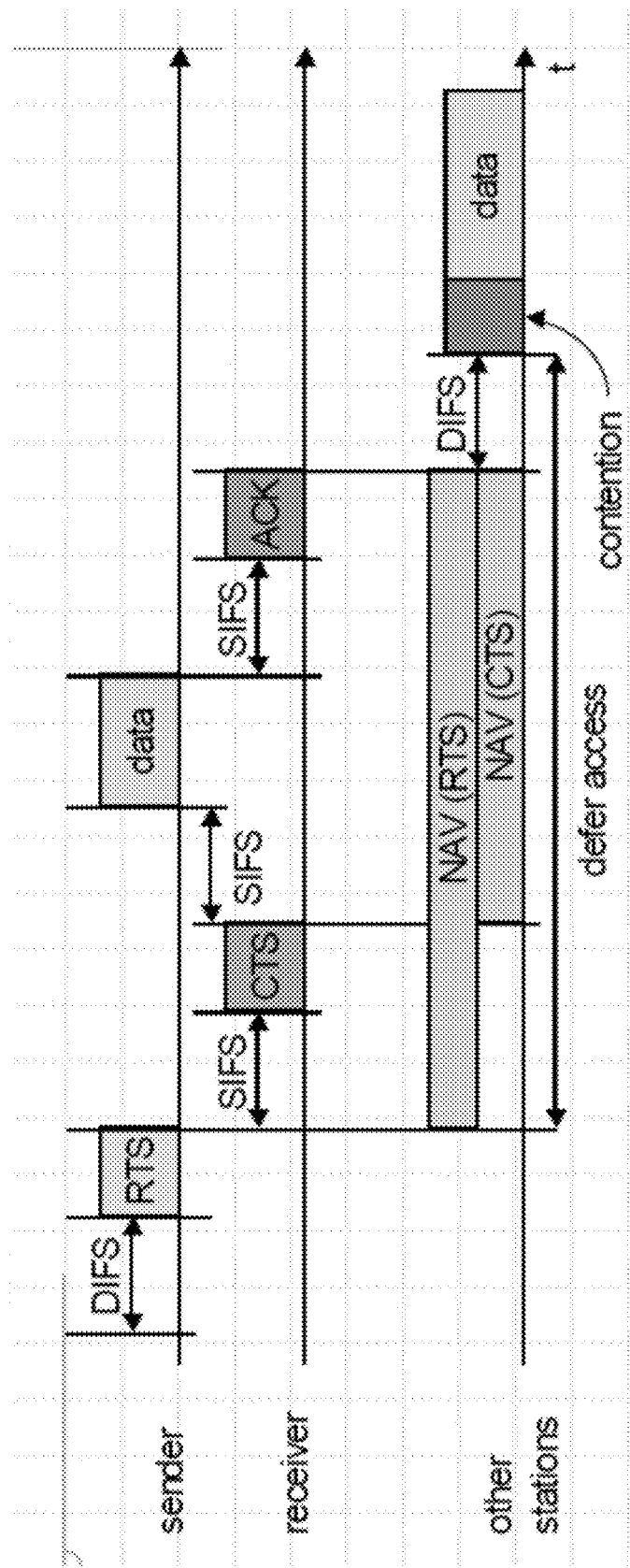
Figure 6a: RTS – CTS timeline

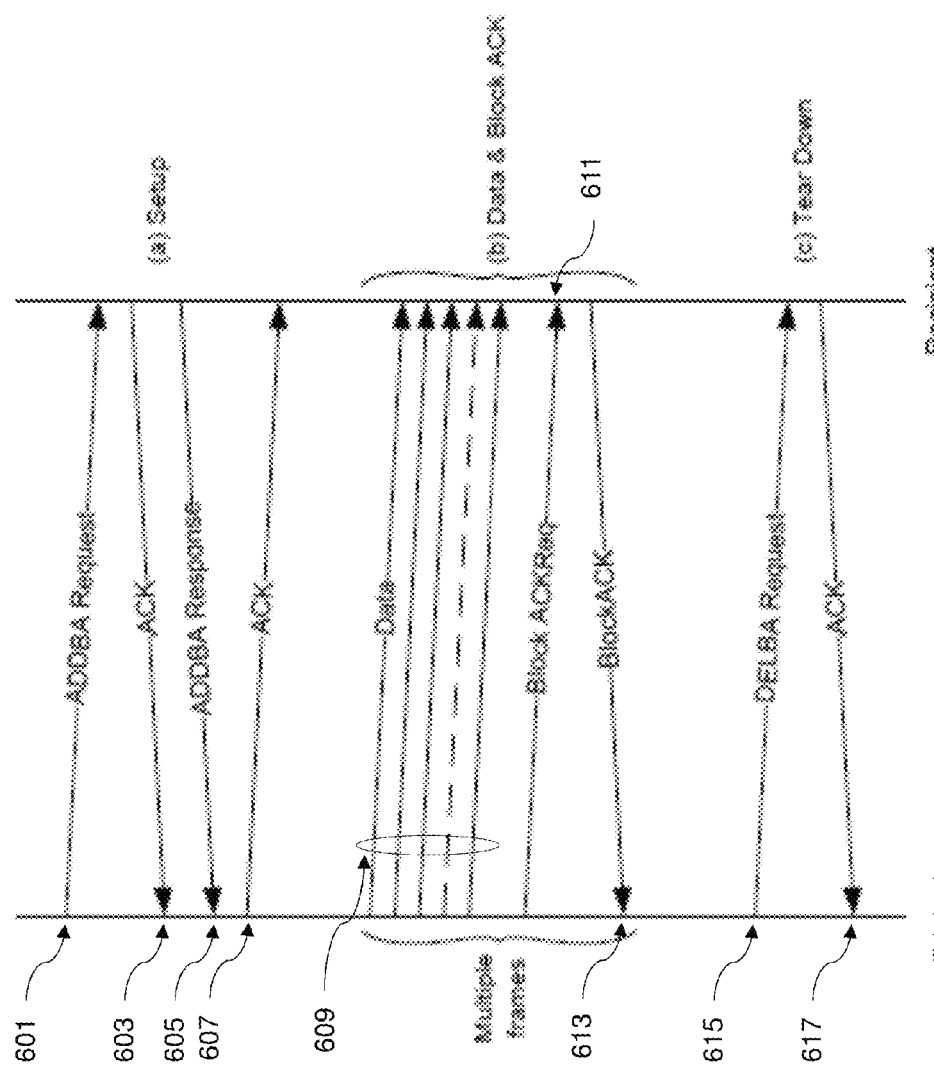
Figure 6b: Block Ack messages sequence

WI-FI RADIO DISTRIBUTION NETWORK STATIONS AND METHOD OF OPERATING WI-FI RDN STATIONS

CROSS REFERENCE TO RELATED APPLICATIONS

This application claims the benefit of prior U.S. Provisional Application Ser. Nos. 61/840,525, filed Jun. 28, 2013, and 61/903,178, filed Nov. 12, 2013, both of which are incorporated herein by reference in their entirety.

FIELD OF THE INVENTION

The present invention relates generally to the field of Wi-Fi-RDN stations and in particular to such stations comprising multiple-input-multiple-output (MIMO) receiving systems using beamforming.

BACKGROUND OF THE INVENTION

Prior to setting forth a short discussion of the related art, it may be helpful to set forth definitions of certain terms that will be used hereinafter. Many of these terms are defined in the Institute of Electrical and Electronics Engineers (IEEE) 802.11 specification but it should be appreciated that the invention is not limited to systems and methods complying with the IEEE 802.11 specification.

The term "Wi-Fi" is used to refer to technology that allows communication devices to interact wirelessly. The wireless communication may use microwaves, e.g. in the 2.4 GHz and 5 GHz wavebands.

The term "AP" is an acronym for Access Point and is used herein to define a wireless fidelity "Wi-Fi" or other wireless station that is an attachment point for user equipment "UE" to a wireless communications network.

The term "UE" is an acronym for User Equipment(s) and is an example of a station, e.g. Wi-Fi station (STA) that may attach to an AP.

The term "station" or STA is a term used for any participant on the network, for example as used in the 802.11 specification. Both UEs and APs are considered in this context to be examples of stations. In the following the abbreviation STA is used for stations whose packets are detected by a Wi-Fi RDN station implementing embodiments of the invention.

The specific Carrier Sense Multiple Access/Collision Avoidance (CSMA/CA) mechanism used in the 802.11 Media Access Control (MAC) is referred to as the distributed coordination function (DCF). A station that wishes to transmit first performs a clear channel assessment (CCA) by sensing the medium for a fixed duration, the DCF interframe space (DIFS).

SIFS, Short Inter Frame Space, as defined in the 802.11 specifications is period between reception of the data frame and transmission of the ACK. SIFS is shorter than DIFS.

The term Clear Channel Assessment (CCA) as used herein refers to the CCA function as defined in the 802.11 specifications.

The term Base Band Processor (BBP) as used herein refers to encoding data and decoding data so as to create the required Wi-Fi baseband signal for all versions of the 802.11 protocol(s).

The term Enhanced distributed channel access (EDCA) is an extension of the basic DCF introduced in the 802.11e amendment to support prioritized quality of service (QoS). The EDCA mechanism defines four access categories (ACs).

The term AC is an acronym for Access Category as used herein refers to AC as defined in the 802.11 specifications. Each AC has a specific values of access parameters, e.g., contention window maximum or minimum CWmin or CWmax, Arbitration Inter-Frame Space Number AIFSN and TXOP (transmit opportunity) limit.

The term CW is an acronym for contention window as defined in the 802.11 specifications. The random backoff count (number of slots needed to wait before retransmission) is selected from the range [0, CW], where CW is typically equal to CWmin.

The term transmit opportunity (TXOP) is a bounded period during which a station may transfer data of particular traffic as defined in the 802.11 specifications.

The term power-save multi-poll (PSMP) is a scheduling technique introduced in 802.11n to optimize channel access for devices that receive and transmit small amounts of data periodically and would like their communications interface to remain inactive most of the time to conserve power, i.e. when they are not actively transmitting or receiving frames.

The term "MIMO" is an acronym for multiple input multiple output and as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

"Channel estimation" is used herein to refer to estimation of channel state information which describes properties of a communication link such as signal to noise ratio "SNR" and signal to interference plus noise ratio "SINR". Channel estimation may be performed by user equipment or APs as well as other components operating in a communications system.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers. At least one of the combiners has antenna distinguishing circuitry, wherein the antenna distinguishing circuitry is configured to distinguish between any one of the signals feeding the combiner. The beamformer is controlled by a processor, e.g. part of UE baseband resources, which uses metrics, e.g. channel estimation of each antenna (also known as a "Look-Thru" process), to calculate and set up beamformer weights, or uses a weights search procedure by tuning one antenna of the beamformer based on SINR or data rate (e.g. using a search algorithm). The weights determine the relative amounts of signals from each antenna that are used in the combiner.

The term "Receiving Radio Distribution Network" or "Rx RDN" or simply "RDN" as used herein is defined as a group of beamformers as set forth above.

A Wi-Fi RDN station equipped with one receive antenna or more may be augmented by replacing the connection between a given receiver input and its antenna with a Radio-Distribution-Network (RDN) that combines several additional antennas together and feeds the RF combined signal to the radio input in such a way that increases directivity and equivalent antenna gain for one or all of the legacy radios in the station.

A Wi-Fi RDN station performs from time to time a look through process (Look-Thru) to obtain channel estimation of a single antenna using antenna distinguishing circuitry configured to selectively disconnect and terminate all but one of the antennas so that only one signal coming from the antennas is conveyed to the combiner's output, at a time; such a Look-Thru can be performed every few packets.

SUMMARY

While using a single antenna for channel estimation (Look-Thru), the signal plus interference to noise ratio (SINR) is lower than the one enjoyed while all antennas participate in beamforming, and if this Look-Thru is performed while receiving data from a serving AP, the average gain is a combination of no gain packets during Look-Thru (because beamforming cannot be done during Look-Thru) and high gain packets when antennas are combined in a beamformer.

To mitigate such the partial loss of gain which occurs while channel estimation is being carried out, embodiments of the invention may comprise a method in which channel estimation or Look-Thru is performed as much as possible while the serving AP communicates with one or more other STAs.

According to embodiments of the invention, a Wi-Fi radio distribution network (RDN) station is provided for use in a wireless communications network comprising a plurality of wireless stations. The Wi-Fi RDN station may comprise: a multiple-input-multiple-output (MIMO) receiving system configured to operate in accordance with a channel estimation MIMO receiving scheme; and a RDN connected to the MIMO receiving system. The RDN may comprise at least one beamformer arranged to be fed by two or more antennas, wherein each of the beamformers includes a combiner configured to combine signals coming from a plurality of antennas associated with the respective beamformer into a single signal. The MIMO receiving system is configured to perform one or both of channel estimation using a single antenna or beamforming. Both said channel estimation and said beamforming may be based on one or more packets addressed to one or more wireless stations in the communications network other than the Wi-Fi RDN station.

According to other embodiments of the invention a method of performing channel estimation at a first station being served by an access point "AP" in a wireless communications system may comprise: detecting transmission of a packet; determining that the packet was transmitted from or sent to a station other than said first station being served by said AP; determining that the next packet to be transmitted by the AP will be for said station other than said first station; performing channel estimation using a single antenna while the AP is transmitting to said other station.

According to other embodiments of the invention a method of operating a Wi-Fi radio distribution network (RDN) station for use in a wireless communications network comprising a plurality of wireless stations, the Wi-Fi RDN station may comprise: performing one or both of channel estimation using a single antenna or beamforming, based on one or more packets addressed to one or more wireless stations in the communications network other than the Wi-Fi RDN station.

In order to use another STA's service, the signal used for Look-Thru must be un-precoded, so embodiments of the invention are based on methods where the legacy long term training field, (L-LTF) is used.

A known problem with using the L-LTF for channel estimation, is that the MAC destination address or source address is not known until the data frame is received. In the case of the L-LTF it is well after the L-LTF is received. So channel estimation may be done on the L-LTF and then the data frame is decoded and a decision is made to keep or discard the value depending on whether the packet is addressed to the station that decoded it.

Wi-Fi is a time division duplex system (TDD), where the transmitting and receiving functions use the same channel, implemented with a limited amount of frequency resources that use techniques of collision avoidance (CSMA/CA) to allow multiple user equipment's (UEs) to share the same channel.

Embodiments of the invention provide a station with a way to predict when its serving AP will transmit a packet to other STAs and set up RDN for channel estimation of an antenna accordingly. This may be based on Wi-Fi CSMA/CA protocol. For example according to embodiments of the invention it is possible to estimate when CTS, Data and acknowledgement (ACK) packets will start after the RTS and do channel estimation on the packet from the AP addressed to another STA.

When other STA's traffic becomes low and sparse, the station will need from time to time to perform look through on its own received packets. The criterion for determining when this should take place may be the ratio between air time or number of other STAs' packets and air time or number of its own packets over a period (e.g. 100 ms or few seconds).

When no other STAs are operating on the network (e.g. at home) or other STAs' traffic becomes low, the station may revert to a weights search procedure controlled by a search algorithm to determine the beamformer weights, or channel estimation using a single antenna, both of which may be based on packets addressed to the station.

BRIEF DESCRIPTION OF THE DRAWINGS

For a better understanding of the invention, and in order to show how it may be implemented, references are made, purely by way of example, to the accompanying drawings in which like numerals designate corresponding elements or sections.

FIG. 6*a* shows an example of RTS-CTS timeline according to embodiments of the invention;

FIG. 6*b* illustrates a Block Ack message sequence chart according to embodiments of the invention;

Figure 1A:
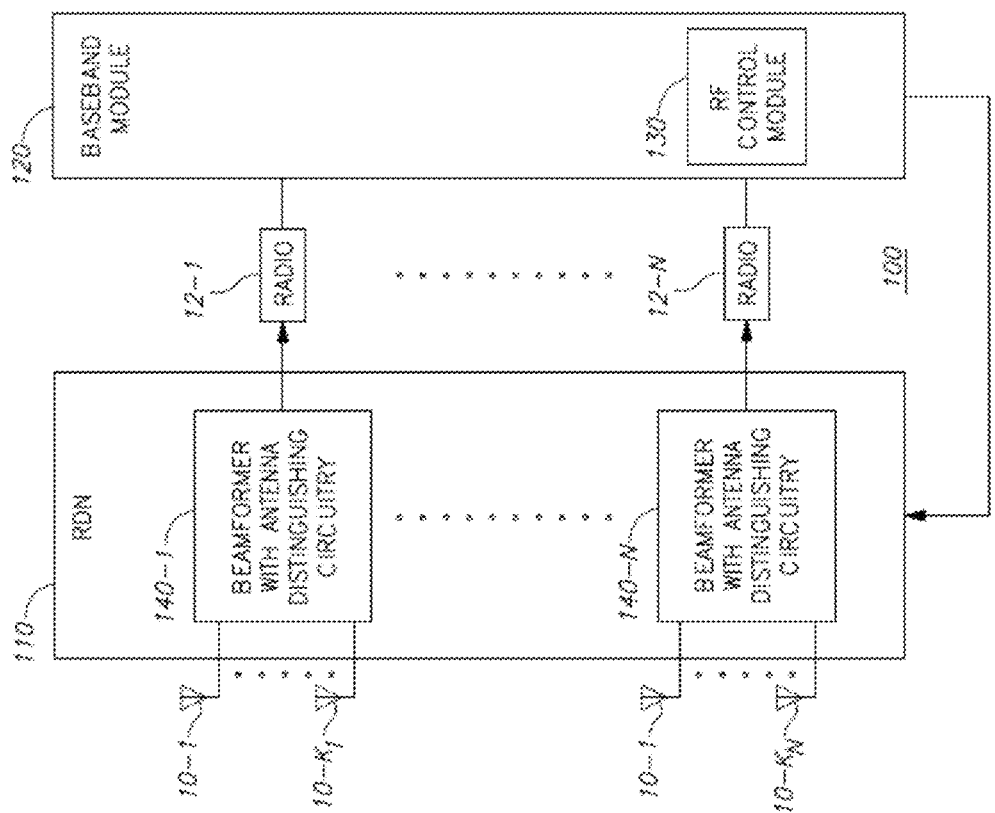
FIG. 1A illustrates a Wi-Fi RDN station equipped with a plurality of receive antennas according to embodiments of the invention.

The drawings together with the following detailed description are designed make the embodiments of the invention apparent to those skilled in the art.

DETAILED DESCRIPTION OF EMBODIMENTS OF THE INVENTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

The invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting. In the description that follows, a Wi-Fi RDN station with N radios and M antennas, where wherein M is greater than N, is configured to perform channel estimation on each antenna of N beamformers according to Wi-Fi protocol.

FIG. 1A illustrates a Wi-Fi RDN station. This may be for example a station that was equipped with one receive antenna or more and has been augmented by replacing the connection between a given receiver input and its antenna, with an RDN that combines several additional antennas together and feeds the RF combined signal to the radio input in such a way that increases directivity and equivalent antenna gain for one or all of the legacy radios.

Figure 1B:
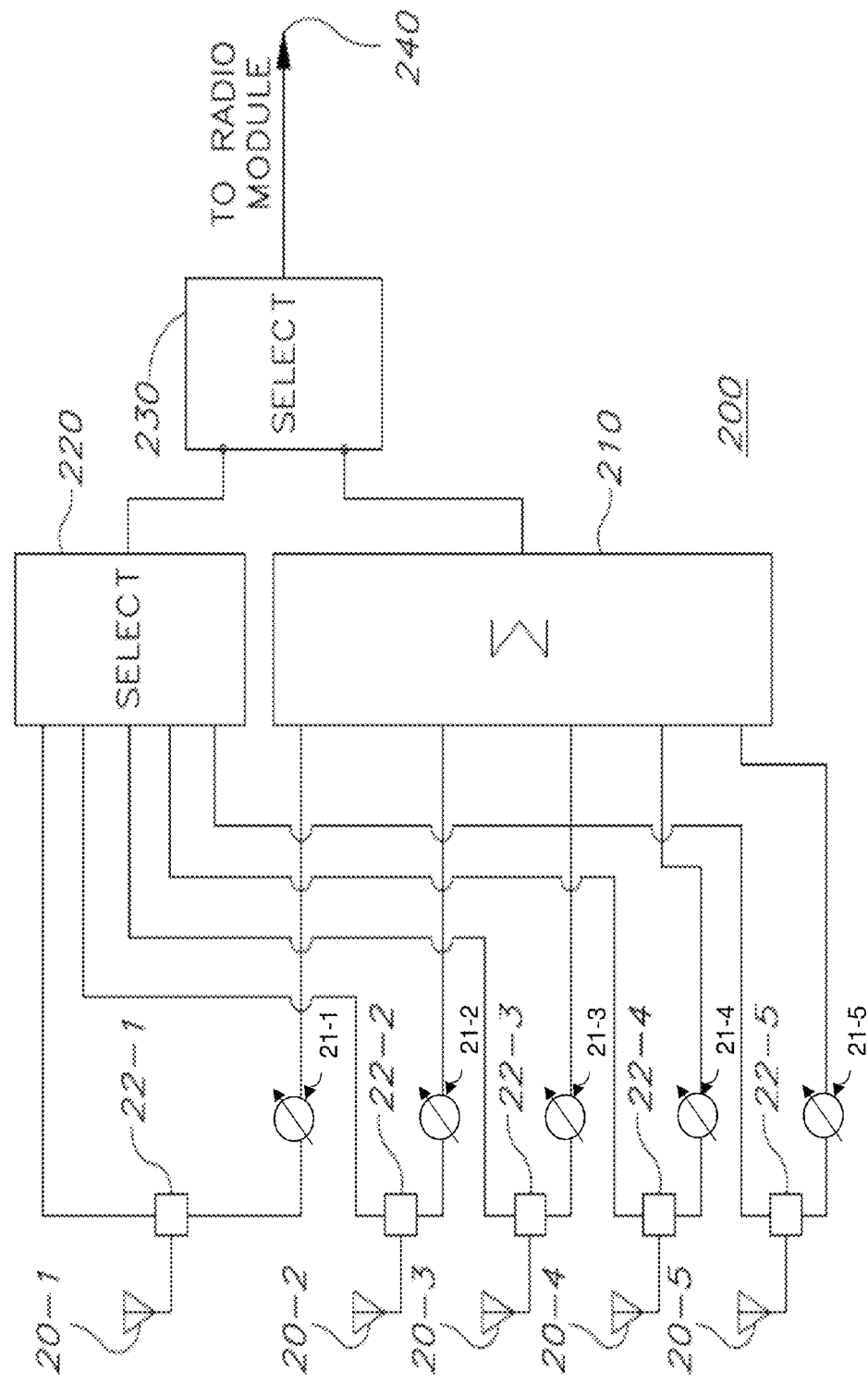
FIG. 1B illustrates a beamformer with antenna distinguishing circuitry according to embodiments of the invention.

FIG. 1A is a high level block diagram illustrating a Wi-Fi RDN station according to embodiments of the present invention. Receiving system 100 includes a multiple-input-multiple-output (MIMO) receiving system baseband module 120 having N branches and configured to operate, on the baseband level, in accordance with a channel estimation MIMO receiving scheme. System 100 further includes a radio distribution network 110 (RDN) connected to baseband module 120 via radio circuits 12-1 to 12-N. RDN 110 includes at least one beamformer with antenna distinguishing circuitry such as 140-1, being fed by (e.g., receiving signals from) two or more antennas such as 10-1 to 10-$K_1$, so that a total number of antennas in system 100 is $M=K_1+K_2+\ldots+K_N$, wherein M is greater than N. As shown in FIG. 1B, additionally, each one of the beamformers includes a combiner configured to combine signals coming from the antennas into a single combined signal converted to baseband by radio module 12-1 to 12-N. Baseband module 120 further includes an RF control module 130 configured to tune RDN 110, for example by adjusting phase shifters located within beamformers 140-1 to 140-N.

As shown above, system 100 includes one beamformer with antenna distinguishing circuitry 140-1 to 140-N for each group of antennas 10-1 to 10-$K_1$ that is being combined into a single radio circuit $12_1$. In operation, each beamformer 140-1 to 140-N is configured to distinguish between (e.g., to isolate individual contributions of) the signals coming from or received from the antennas 10-1 to 10-$K_1$ which feed (e.g. send signals to) the respective radio circuits 12-1 to 12-N. As will be explained below, there are many methods that may be used in order to implement the signal distinguishing operation which is may be used for derivation of phase and/or amplitude of each signal. These distinguishing schemes may further be controlled via control module 130. As will be described below the beamformer with antenna distinguishing circuitry 140-1 to 140-N may include radio frequency (RF) elements such as phase shifters, switches, terminators, and amplifiers.

FIG. 1B shows in more detail a beamformer with antenna distinguishing circuitry which may be used in the system shown in FIG. 1A according to embodiments of the invention. Any of the beamformers 140-1 to 140-N shown in FIG. 1A may be constructed in the manner of the beamformer shown in FIG. 1B. Beamformer 200 shown FIG. 1B in is an exemplary non limiting example with five antennas 20-1 to 20-5. The signals from each of the antennas 20-1 to 20-5 may be sent to a combiner 210 via respective phase shifters 21-1 to 21-5. The beamformer includes a selectable bypass 22-1 to 22-5 for each antenna 20-1 to 20-5 configured to bypass a combiner 210 and convey the signal from each one of antennas 20-1 to 20-5 to an output selector 220. The output selector may be configured to deliver to the MIMO receiving system the signal from only one antenna at a time.

Wi-Fi is a time division duplex system (TDD), where the transmitting and receiving functions use the same channel, implemented with a limited amount of frequency resources that use techniques of collision avoidance (CSMA/CA) to allow multiple user UEs to share the same channel. The Wi-Fi 802.11 PHY frame structure and MAC layer will be illustrated by FIGS. 2-5 as follows.

Figure 2:
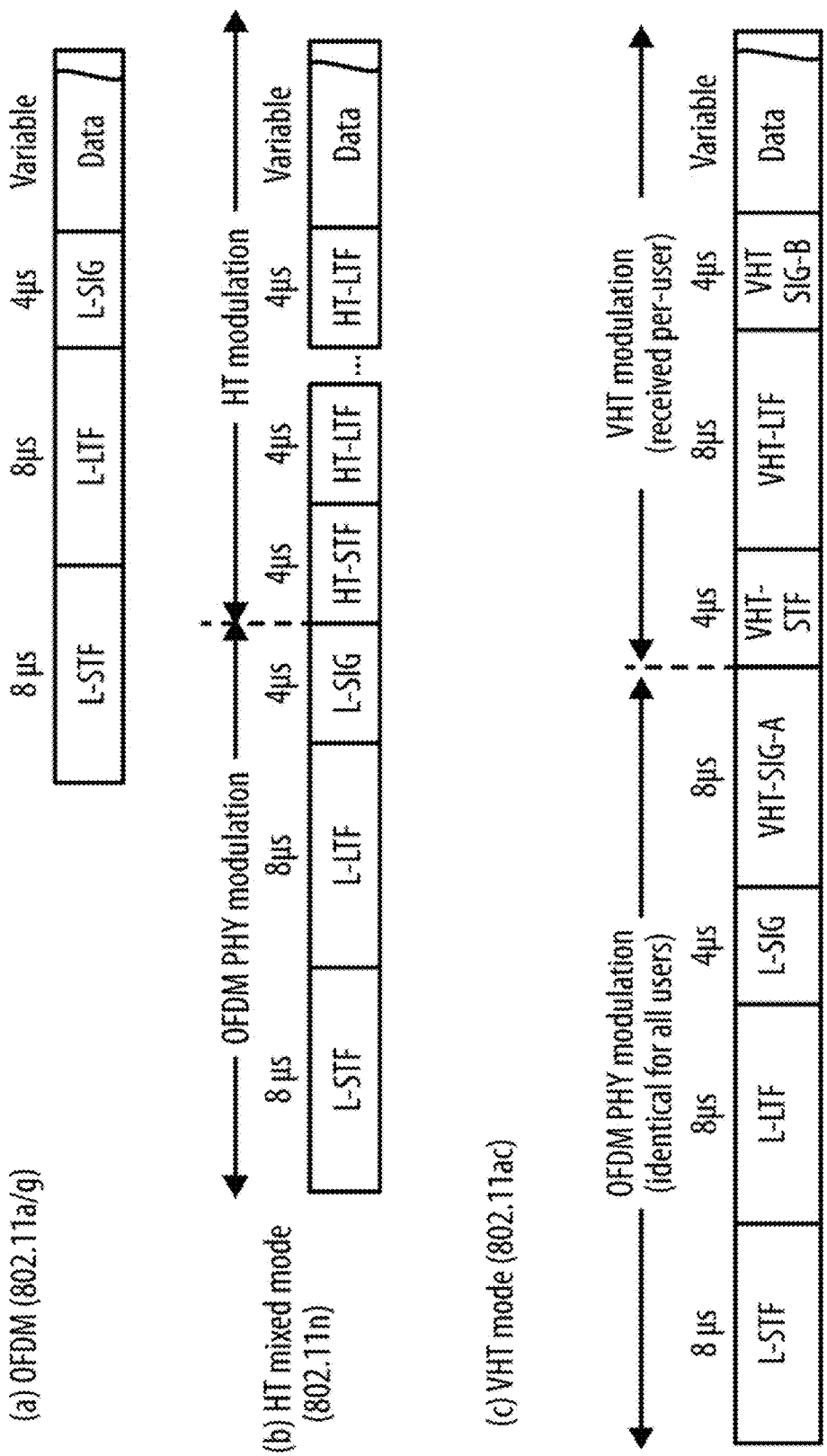
FIG. 2 shows the L-LTF in preamble of (a) 802.11a/g, (b) 802.11n and (c) 802.11ac packets.

FIG. 2 shows the L-LTF in preamble of (a) 802.11a/g, (b) 802.11n and (c) 802.11ac packets according to some embodiments. The L-LTF is for channel estimation, fine frequency-offset correction, and symbol timing. The L-LTF is 8 microseconds long (two OFDM symbols), does not contain channel coding, and is not scrambled. A Wi-Fi RDN station can obtain channel estimation on L-LTF in legacy preamble of received packet for each antenna as shown in FIG. 2.

Figure 3:
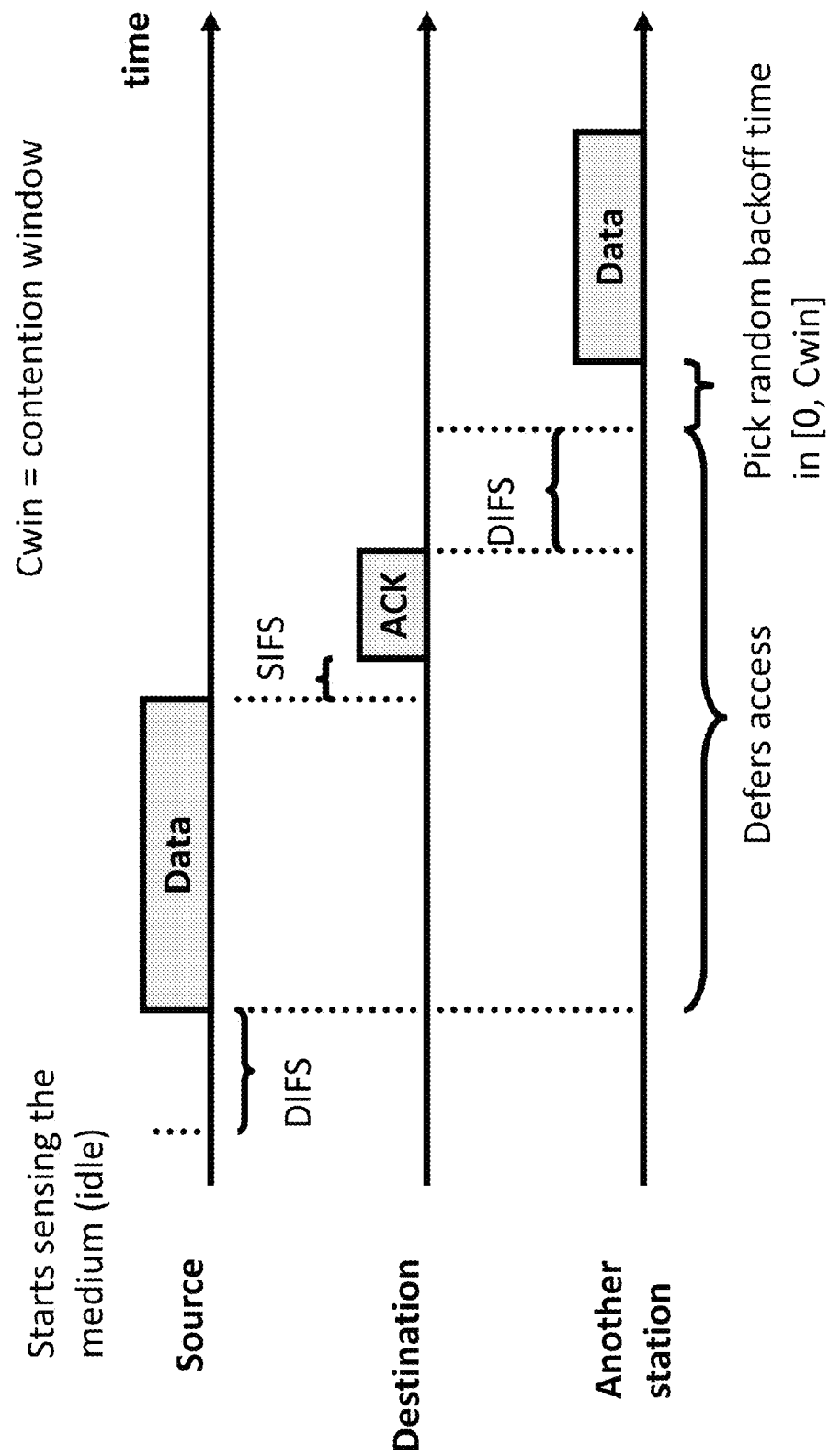
FIG. 3 illustrates an example of the 802.11 CSMA/CA Data-ACK timeline according to embodiments of the invention.

FIG. 3 illustrates an example of 802.11 CSMA/CA data transfer using the Data/ACK exchange and shows three time lines according to some embodiments. The uppermost time line of FIG. 3 may be used by a station that wishes to transmit. This station first performs a CCA by sensing the medium, e.g. the channel over which the signals are transmitted, for a fixed duration, DIFS. If the medium is idle, e.g. no signals are being transmitted over the channel, then the station gains access to the medium, e.g. channel, and begins sending a data frame. The next time line in FIG. 3 is applicable to a destination station. The destination station will send an ACK frame if the data frame was received correctly with the SIFS between two frames. Another station, for which an example time line is shown lowermost in FIG. 3, will not gain access to the medium during that frame exchange sequence since it must defer for a fixed duration, DIFS, which is longer than SIFS. Destination stations may access the medium using SIFS timing. Such stations do not check if the medium is busy, but simply switch to transmit mode (if not already in transmit mode) and begin transmission at the SIFS boundary.

802.11 CCA uses both physical and virtual carrier sense functions to determine the state of the medium. The physical carrier sense resides in the PHY and uses energy detect and preamble detect with frame length deferral to determine when the medium is busy. The virtual carrier sense resides in the MAC and uses reservation information carried in the duration field of the MAC headers announcing impeding use of the medium.

Figure 4:
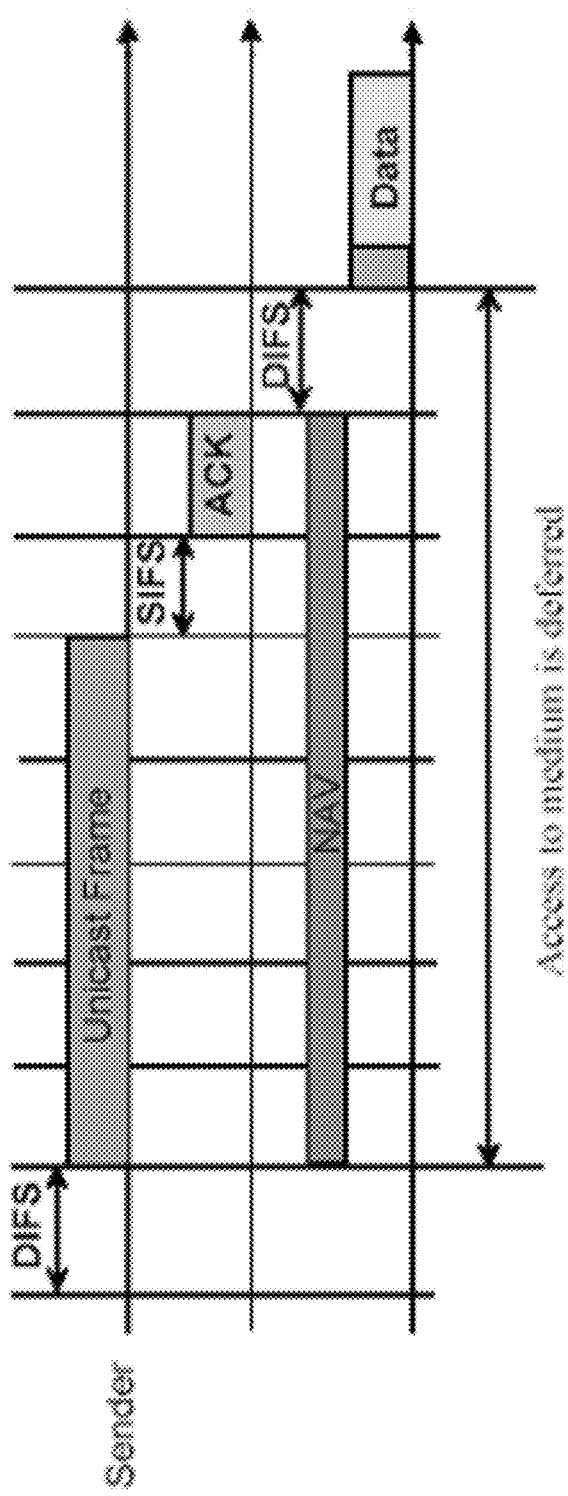
FIG. 4 shows an example of Network Allocation Vector (NAV) timeline according to embodiments of the invention.

The virtual carrier sense mechanism is called the network allocation vector (NAV) as shown in FIG. 4. The duration of the NAV is the total of the frame duration (following the DIFS), in this example shown as a unicast frame, the SIFS and the ACK. The medium is determined to be idle only when both the physical and virtual carrier sense mechanisms indicate it to be so. Other stations will not access the channel during the NAV period.

Figure 5:
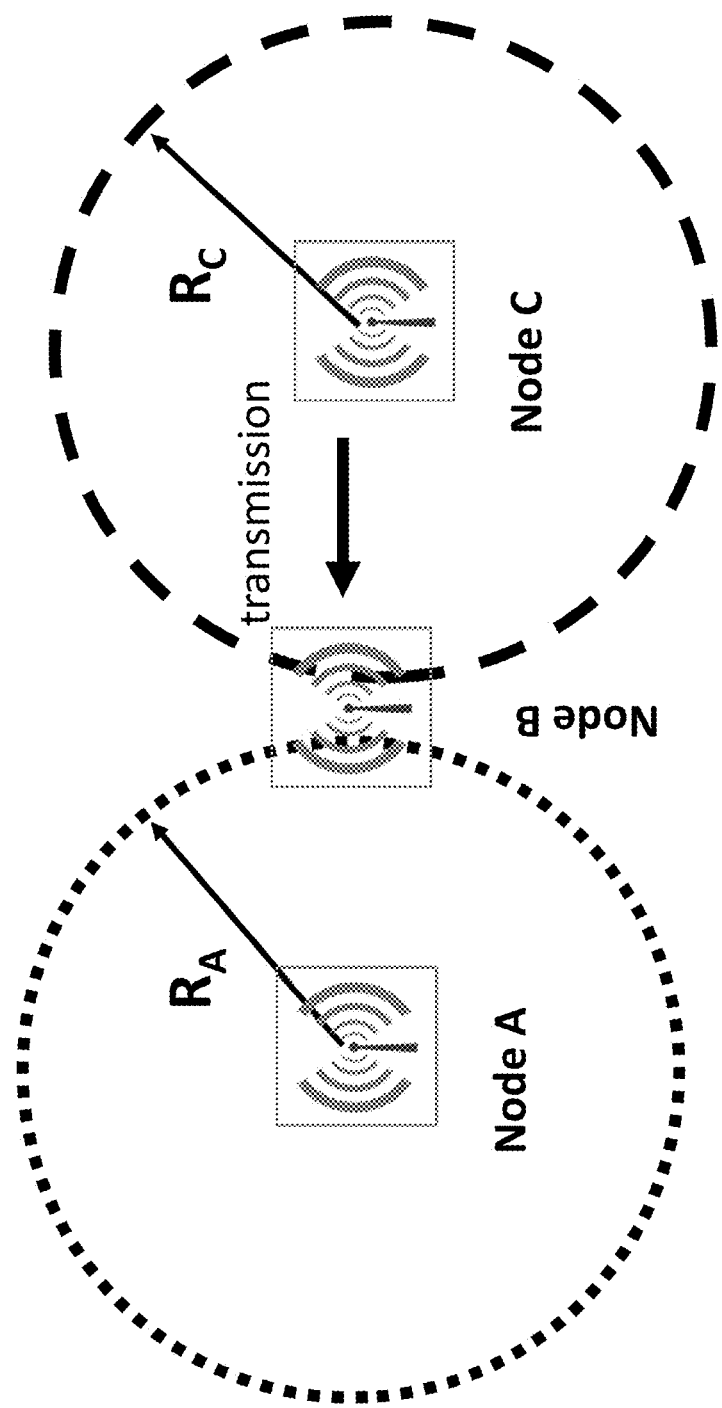
FIG. 5 illustrates an example of a hidden node problem in a wireless communication system according to embodiments of the invention.

FIG. 5 illustrates an example of hidden node problem. Three nodes A, B and C are shown. The circles around nodes A and C indicate their range of transmission/reception. Transmission from Node C can be detected by Node B but it is not detected by Node A since Node C is outside of the range of transmission and reception of Node A. Node A is not aware that Node B is currently busy receiving from Node C, and therefore may start its own transmission, causing a collision. The nodes in FIG. 5 could be stations of any kind. For example node A could be a Wi-Fi RDN station, Node B could be its serving AP and Node C could be another station. Node B could be an AP serving both stations Node A and Node C. In other words stations Node A and Node C could be attached to a wireless, e.g. Wi-Fi network via an AP Node B.

To protect a station's transmission/reception from collision with hidden nodes, a station may begin a sequence with an RTS/CTS exchange as illustrated in FIG. 6a. FIG. 6a shows time lines for a source or sender, a destination or receiver and another station in a similar manner to FIG. 3. The RTS is sent by the sender station, e.g. at Node A, and the station addressed by the RTS, e.g. an AP at Node B, responds with a CTS. The RTS frame occupies less air time than the data frame and is thus less susceptible to collision than the longer data frame transmitted alone. Also, loss of the RTS to collision would be quickly detected. The RTS and CTS are robustly modulating so that they are broadly received. A station other than the sender and receiver stations would receive the CTS frame and set its NAV to defer for the subsequent frame exchange.

FIG. 6a shows that a sender transmits a RTS after the DIFS. The RTS indicates how long the sender wants to hold the medium. The receiver (if it senses the channel is clear) replies with CTS echoing expected duration of transmission. Any node that hears the CTS knows it is near the receiver and should refrain from transmitting for that amount of time. Any node that hears the RTS knows it is near the sender and should refrain from transmitting for the amount of time in the RTS NAV field. Any node that hears the RTS knows that the sender will start sending data after it receives the CTS and since this time is predictable within about 30 μsec (two SIFS intervals) if the sender does not start sending data within that window, that node is free to transmit as it can be inferred that a CTS was not send and/or was not received. The receiver sends ACK to sender after successfully receiving a frame. The value of the NAV encompasses the time for the ACK from the receiver, so it is not necessary for other nodes to see the receiver's ACK.

An RTS/CTS exchange at the beginning of a TXOP sets the NAV of stations in the vicinity of both the initiator and recipient. The RTS and CTS frames are transmitted at a basic rate and are thus widely received. The robust modulation used and the fact that the widely received frames are transmitted from both ends of the link makes the RTS/CTS exchange the most robust mechanism for establishing protection with hidden nodes and mix of legacy stations.

The Block ACK policy feature, included in the ratified IEEE 802.11e amendment, improves system throughput by reducing the amount of overhead required by a station to acknowledge a burst of received traffic. The Block ACK mechanism is initialized by an exchange of Add Block Acknowledgment (ADDBA) Request/Response frames. After initialization, blocks of QoS data frames can be transmitted from the originator to the recipient. FIG. 6b illustrates the message sequence chart for the setup, data and Block ACK transfer, and the teardown of the Block ACK mechanism. The sequence begins with ADDBA request 601 from sender to receiver, ACK 603 from receiver to sender followed by ADDBA response 605 from receiver to sender then ACK 607 from sender to receiver. Data may then be sent from sender to receiver, examples of which are shown at 609 which may comprise multiple frames. At the end of sending data the sender sends BlockACKReq 611 to the receiver. The receiver responds with ACK 613 confirming that it received the data frames. The sender then sends delete block addition (DELBA) Request 615 to the receiver which responds with ACK 617.

Figure 7:
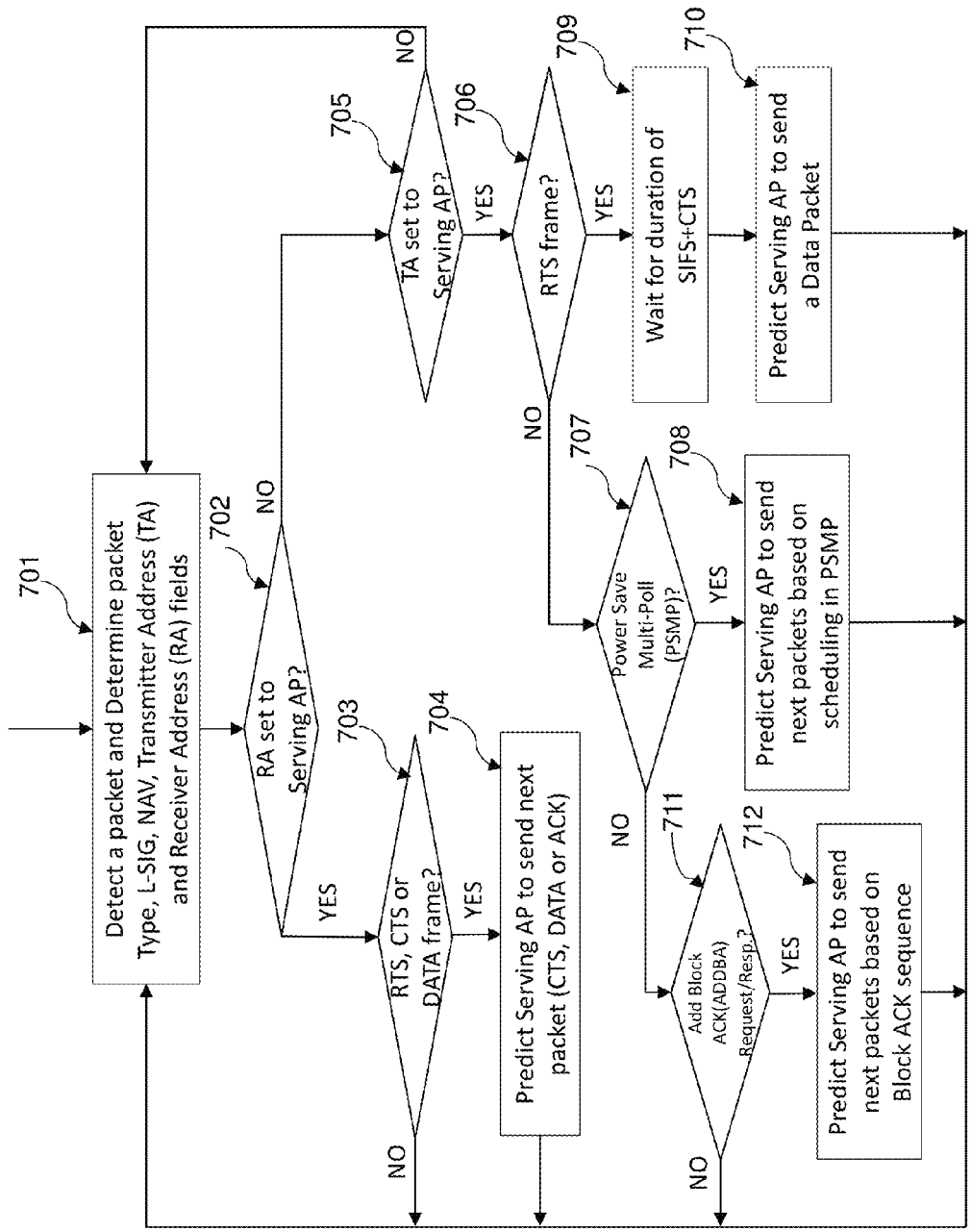
FIG. 7 illustrates a flowchart of a method of predicting of transmission from a serving AP to other STAs according to embodiments of the invention.

According to embodiments of the invention a station may be provided with a way to predict when its serving AP will transmit a packet to other STAs. This may be based on Wi-Fi CSMA/CA protocol. The station may then set up its RDN, e.g. for channel estimation of an antenna, accordingly. According to embodiments of the invention, upon RTS/CTS/DATA/ACK exchange between the serving AP, e.g. Node B in FIG. 5 and another STA, e.g. Node A in FIG. 5,—in either direction, the station can anticipate the next packet to come from its serving AP. When some other STA uploads a packet to the serving AP, the ACK timing will be predicted and used by the station for look-thru (this procedure is independent of RTS/CTS). One possible way of performing this prediction is illustrated in FIG. 7 for a particular set of packet types. According to embodiments of the invention, when the station is idle (initially or no application connection), it can be assumed the AP is transmitting to another station and channel estimation can be done using a single antenna. In this scenario some of the steps of FIG. 7 may be omitted. According to embodiments of the invention it is possible to estimate when CTS, Data and ACK packets addressed to another STA from the AP will start and do channel estimation on the packet as described in FIG. 7 below.

According to embodiments of the invention a Wi-Fi RDN station may perform one or both of channel estimation or beamforming based on one or more packets addressed to one or more other stations communicating with the station's AP. The decision as to whether channel estimation or beamforming are to be performed may depend, for example, on whether the AP is about to send a new packet to another channel. If it is, channel estimation may be performed using this new packet. If it is not, e.g. the next packet is bound for the Wi-Fi RDN station, and if the level of traffic to other stations is high, previous channel estimations based on packets bound for other stations may be used for beamforming to receive the next packet. Thus both the beamforming and the channel estimation are based on one or more packets addressed to stations other than the Wi-Fi RDN station.

Therefore according to embodiments of the invention a Wi-Fi RDN station may be configured to predict when an AP is about to transmit a packet to an AP. The operations of FIGS. 7 and 8 may be performed for example in the baseband module 120.

FIG. 7 illustrates a flow chart of prediction of transmission from a serving AP, e.g. at node B in FIG. 6, to other STAs, according to some embodiments of the invention. Initially, at operation 701 the Wi-Fi RDN station detects transmission of a packet. The station may then determine for example packet type, L-SIG, NAV, Transmitter Address (TA) and Receiver Address (RA) fields. As part of the prediction process the station may identify packets for which the RA is the address of the serving AP. Thus the station determines whether the packet is destined for its serving AP at operation 702. If the result of the determination is positive, i.e. the packet is for its serving AP, the flow proceeds to operation 703 where the station determines whether the packet is a RTS, CTS or DATA frame. If the result of the determination at operation 703 is positive, e.g. the packet is a RTS, CTS or DATA frame for serving AP, then the station predicts that the AP is about to send a packet to another STA at operation 704. Further the Wi-Fi RDN station can predict what type of packet will be sent to the STA depending on the type of packet that has been detected. Thus depending on whether the detected packet is RTS, CTS or DATA, the next packet to be sent from the serving AP will be next packet in the sequence, i.e. CTS, DATA or ACK respectively.

If the result of the determination at operation 703 is negative, the flow reverts to operation 701.

As another part of the prediction process the station may identify packets for which the TA is the address of the serving AP. Thus according to embodiments of the invention, if the result of the determination at operation 702 is negative, because the RA in the detected packet is not set to the serving AP, the flow continues to operation 705 where the received packet's TA is checked to determine whether it is set to the serving AP. It will be appreciated that the flows commencing with operations 702 and 705 may be performed in parallel or in the opposite order with the TA being checked before the RA. If the result of the operation 705 is negative the flow reverts to operation 701. If the result of operation 705 is positive and the TA is that of the serving AP, the subsequent operations may depend on the type of frame that has been detected. According to embodiments of the invention, the subsequent operations are performed to determine which of any identified packets addressed to the serving AP precede a transmission from the serving AP to a station other that the Wi-Fi RDN station. Thus subsequent operations may determine whether the frame is RTS, PSMP or ADDBA. These may be done in any order or in parallel. One possible running order is described below.

The packet may be further checked to determine whether it is an RTS at operation 706. If the result of the determination at operation 706 is positive and the packet is an RTS frame from the serving AP, the flow proceeds to operation 709. Here, the station waits for the duration of a SIFS and CTS. Then at operation 710 it is predicted that the serving AP will send a data packet if the packet is determined to be RTS from serving AP.

If the determination at operation 706 is negative the flow continues to operation 707 where it is determined whether the packet is a PSMP frame. PSMP optimizes for power consumption by providing the downlink and uplink schedule at the start of a PSMP phase so that individual stations can shut down their receivers until needed in the downlink phase and transmit when scheduled during the uplink phase with performing CCA. The station predicts that the serving AP will send next packets based on scheduling in PSMP at operation 708 if the packet is determined at operation 707 to be a PSMP frame containing the schedule for the subsequent downlink and uplink transmissions from the serving AP.

If the result of the determination at operation 707 is negative, the flow proceeds to operation 711. Here it is determined whether the received frame is an ADD Block Acknowledge Request or Response frame. If the result of the determination is positive, the flow proceeds to operation 712. At operation 712, the station predicts that the serving AP will send next packets based on the Block Ack sequence if the received frame was determined to be an ADD Block Acknowledge Request or Response frame at operation 711. If the result of the determination at operation 711 is negative, the flow reverts to operation 701.

Thus, operations 704, 712, 708 and 710 all predict from previous determinations that the serving AP is about to send a packet to another STA. The flow of FIG. 7 may be continuous and each prediction operation 704, 712, 708 or 710 may be followed by another iteration of the process commencing with operation 701 detecting another packet. The results of the flow of FIG. 7 may be used in the flow of FIG. 8 described further below. FIG. 7 describes an example of a prediction process for particular kinds of data packets. It will be appreciated that the flow of FIG. 7 may be modified to include additional types of data packet, of fewer types of data packet, depending on the messaging protocol being used. All that is required is a known sequence such that it is possible to predict that one kind of packet will be followed by another kind of packet. In the event of such a prediction, the Wi-Fi RDN station may perform channel estimation using a single antenna (Look-Thru) on the predicted packet from the AP addressed to the other STA. One process in which this channel estimation may be used is illustrated in FIG. 8.

Figure 8:
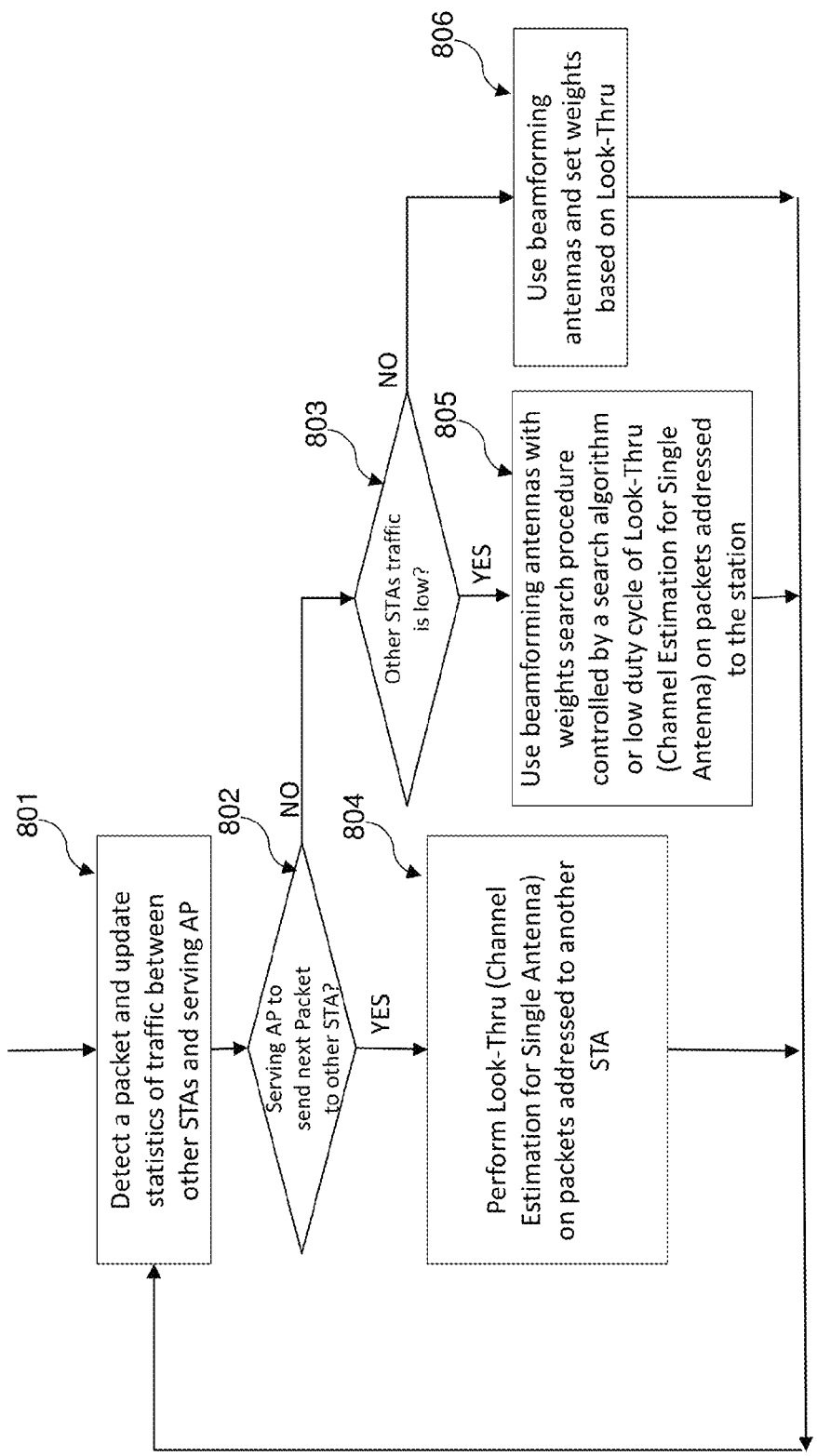
FIG. 8 illustrates an example of transitions by a Wi-Fi RDN station between channel estimation and beamforming modes according to embodiments of the invention.

FIG. 8 illustrates an example of transitions between Wi-Fi RDN station receiving modes according to embodiments of the invention. These modes differ by manner of channel estimation and/or beamforming and according to some embodiments depend on whether a packet to another STA is predicted and/or the level of other STAs' traffic. The level may be determined by any known criteria, for example the ratio between air time or number of other STAs' packets and air time or number of its own packets over a period (e.g. 100 ms or few seconds). The example flow of FIG. 8 commences with the Wi-Fi RDN station detecting a packet at operation 801. Also at operation 801 the station updates statistics of traffic between other STAs and the serving AP. The statistics may include for example ratio between air-time or number of packets addressed to other stations and air-time or number of packets addressed to the Wi-Fi RDN station over a period. Next at operation 802, the station determines whether or not the packet is addressed to or originates from another STA and if so predicts whether or not the serving AP is about to send a next packet to the other STA. The prediction procedure of transmission from serving AP to another STA may be performed according to the flow illustrated in FIG. 7.

If the determination at operation 802 is positive and it is predicted in operation 802 that the next packet from the serving AP will be addressed to another STA, the station may adopt a first receiving mode in which it performs channel estimation using a single antenna (Look-Thru) on packets addressed to the other STA at operation 804. According to embodiments of the invention, each channel estimation operation may require only one packet.

If the determination at operation 802 is negative, for example the next packet is not addressed to another STA but is addressed to the Wi-Fi RDN station implementing the flow of FIG. 8, the mode to be adopted may depend on the level of traffic to other STAs. Thus the station may determine whether traffic between other STAs and the AP is low or not at Step 803. This may be determined for example using a threshold, and may use the statistics updated at operation 801. As noted above the statistics may include the ratio between air-time or number of packets addressed to other STAs and air-time or number of packets addressed to the Wi-Fi station over a period. If it is determined at operation 803 that traffic of other STAs is not low, for example it is above a predetermined threshold, the station may set weights for use in beamforming based on Look-Thru performed previously and use beamforming antennas to receive next packet at Step 806. This can be done because in a high traffic situation the station will have recent channel estimations based on packets bound for other stations, for example from previous iterations of operation 804, and therefore repeat channel estimation may not be necessary. Thus according to this embodiment of the invention, at operation 806 both the channel estimation, done previously, and the beamforming, e.g. determination of antenna weights, is based on traffic or one or more packets bound for one or more other stations, i.e. stations other than the Wi-Fi RDN station implementing the flow of FIG. 8.

If it is determined at operation 803 that traffic of other STAs is low, for example it is below a predetermined threshold, the station may perform channel estimation and/or beamforming based on packets addressed to the station. There are a number of ways this can be done. Two possibilities are illustrated in operation 805. One is for the station to use beamforming antennas with a weights search procedure controlled by a search algorithm. In one example of such a procedure, beamforming is performed using a subset of the antennas selected according to predetermined performance criteria. This may avoid the need for channel estimation. Another possibility is for the station to perform channel estimation, e.g. using a single antenna, on packets addressed to the station. This is preferably done using a low duty cycle to minimize the reduction in gain resulting from the effective down time during channel estimation. For example the duty cycle may use no more than 25% of packets for channel estimation, with the other at least 75% being used for beamforming.

According to some embodiments of the present invention, in case internal noise dominates and the level or SNR of the respective signal received during Look-Thru is below a specific threshold, the RDN control module may apply the discrete level "off" to a specific signal coming from the antennas. The station may selectively use a selection of the beamforming antennas associated with a beamformer based on the level or SNR of the respective signal from the antennas with reference to a specific threshold.

The methods described herein are applicable to all versions of the 802.11 protocol, specifically 802.11a, b, g, n and ac.

As will be appreciated by someone skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Thus embodiments of the invention provide one or more tangible or intangible computer readable media comprising instructions which when implemented in a WiFi RDN station cause the station to implement the operations described in the foregoing.

The aforementioned block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A Wi-Fi radio distribution network (RDN) station for use in a wireless communications network comprising a plurality of wireless stations, the Wi-Fi RDN station comprising:
    a multiple-input-multiple-output (MIMO) receiving system configured to operate in accordance with a channel estimation MIMO receiving scheme; and
    a RDN connected to the MIMO receiving system, the RDN comprising at least one beamformer arranged to be fed by two or more antennas, wherein each of the beamformers includes a combiner configured to combine signals coming from a plurality of antennas associated with the respective beamformer into a single signal, and, wherein the MIMO receiving system is configured to select whether to perform channel estimation using a single antenna or beamforming, said selection being based on one or more packets addressed to one or more wireless stations in the communications network other than the Wi-Fi RDN station,
    wherein the MIMO receiving system is configured to determine whether an access point (AP) serving the Wi-Fi RDN station is to send a packet to a station other than the Wi-Fi RDN station and
        if the determination is positive perform said channel estimation using a single antenna; and
        if the determination is negative use one or more alternative methods for beamforming or channel estimation or both, and
    wherein the one or more alternative methods comprise:
        beamforming based on one or more packets addressed to one or more wireless stations in the communications network other than the Wi-Fi RDN station; and
        channel estimation or beamforming based on one or more packets addressed to the Wi-Fi RDN station, and
    wherein the MIMO receiving system is configured to determine the level of packets addressed to stations in the communications network other than the Wi-Fi RDN station based on the ratio between air-time or number of packets addressed to other stations and air-time or number of packets addressed to the Wi-Fi RDN station over a period of time.

2. The Wi-Fi RDN station according to claim 1, wherein the MIMO receiving system is configured to predict that an access point (AP) serving the Wi-Fi RDN station is to send a packet to a station other than the Wi-Fi RDN station, and perform said channel estimation using a single antenna based on one or more packets addressed to said other station.

3. The station according to claim 2, wherein the MIMO receiving system is configured to predict that said serving AP is to send a packet to another station based on one or more of: 802.11 Carrier Sense Multiple Access/Collision Avoidance (CSMA/CA) Data/Acknowledge (ACK) exchange, request to send/clear to send (RTS/CTS) exchange, power-save multi-poll (PSMP) scheduling, detected 802.11 media access control (MAC) frame type, NAV field, receiver address (RA) field and transmit address (TA) field.

4. The Wi-Fi RDN station according to claim 1, wherein the beamforming, based on one or more packets addressed to one or more wireless stations in the communications network other than the Wi-Fi RDN station, comprises determining weights of signals from respective antennas, the weights being determined from a previous channel estimation based on one or more packets addressed to one or more wireless stations in the communications network other than the Wi-Fi RDN station.

5. The Wi-Fi RDN station according to claim 1, wherein the MIMO receiving system is configured to use said beamforming based on one or more packets addressed to the Wi-Fi RDN station only if the level of packets addressed to wireless stations in the communications network other than the Wi-Fi RDN station is determined to be low.

6. The Wi-Fi RDN station according to claim 1, wherein the channel estimation based on one or more packets addressed to the Wi-Fi RDN station uses a single antenna of the Wi-Fi RDN station.

7. The Wi-Fi RDN station according to claim 1, wherein the beamforming based on one or more packets addressed to the Wi-Fi RDN station uses a selection of the beamforming antennas, the selection being based on performance criteria.

8. The Wi-Fi RDN station according to claim 1, wherein the MIMO receiving system is configured to determine the level of packets addressed to wireless stations in the communications network other than the Wi-Fi RDN station and perform:
    beamforming and/or channel estimation based on one or more packets addressed to the station; or
    beamforming based on one or more packets addressed to one or more other stations; depending on the level.

9. The Wi-Fi RDN station according to claim 2, wherein the prediction by said MIMO receiving system includes:
    detecting transmission of packets;

identifying packets for which the receiving address (RA) is the address of an access point (AP) serving the Wi-Fi RDN station;

for identified packets, determining which include any of request to send (RTS), clear to send (CTS) or data frames; and predicting a transmission from the serving AP to a station other than the Wi-Fi RDN station based on the determination.

10. The Wi-Fi RDN station according to claim 2, wherein the prediction by said MIMO receiving system includes:

detecting transmission of packets;

identifying packets for which the transmitting address (TA) is the address of an access point (AP) serving the Wi-Fi RDN station;

determining which of said identified packets addressed to the serving AP precede a transmission from the serving AP to a station other that the Wi-Fi RDN station.

11. The Wi-Fi RDN station according to claim 10 wherein said determining comprises determining those packets that are power save multi-poll (PSMP) frames; and predicting a transmission from the serving AP to a station other than the Wi-Fi RDN station based on the determination.

12. The Wi-Fi RDN station according to claim 10 wherein said determining comprises determining those packets that are request to send (RTS) frames; and said predicting further comprises:

following said determination waiting for the duration of the short inter frame space (SIFS) and clear to send (CTS) times; and predicting a transmission from the serving AP to a station other than the Wi-Fi RDN station following said wait.

13. The Wi-Fi RDN station according to claim 10 wherein the determining comprises determining those packets that are add block acknowledgement (ADDBA) frames, and predicting a transmission from the serving AP to a station other than the Wi-Fi RDN station based on the ADDBA sequence.

* * * * *